J. G. LEYNER, DEC'D.
L. M. LEYNER, ADMINISTRATRIX.
AUTOMATICALLY OPERATING OILING MECHANISM FOR THE INTERIOR MOTOR DRIVEN PARTS OF TRACTORS.
APPLICATION FILED JUNE 10, 1921.
1,424,495.
Patented Aug. 1, 1922.
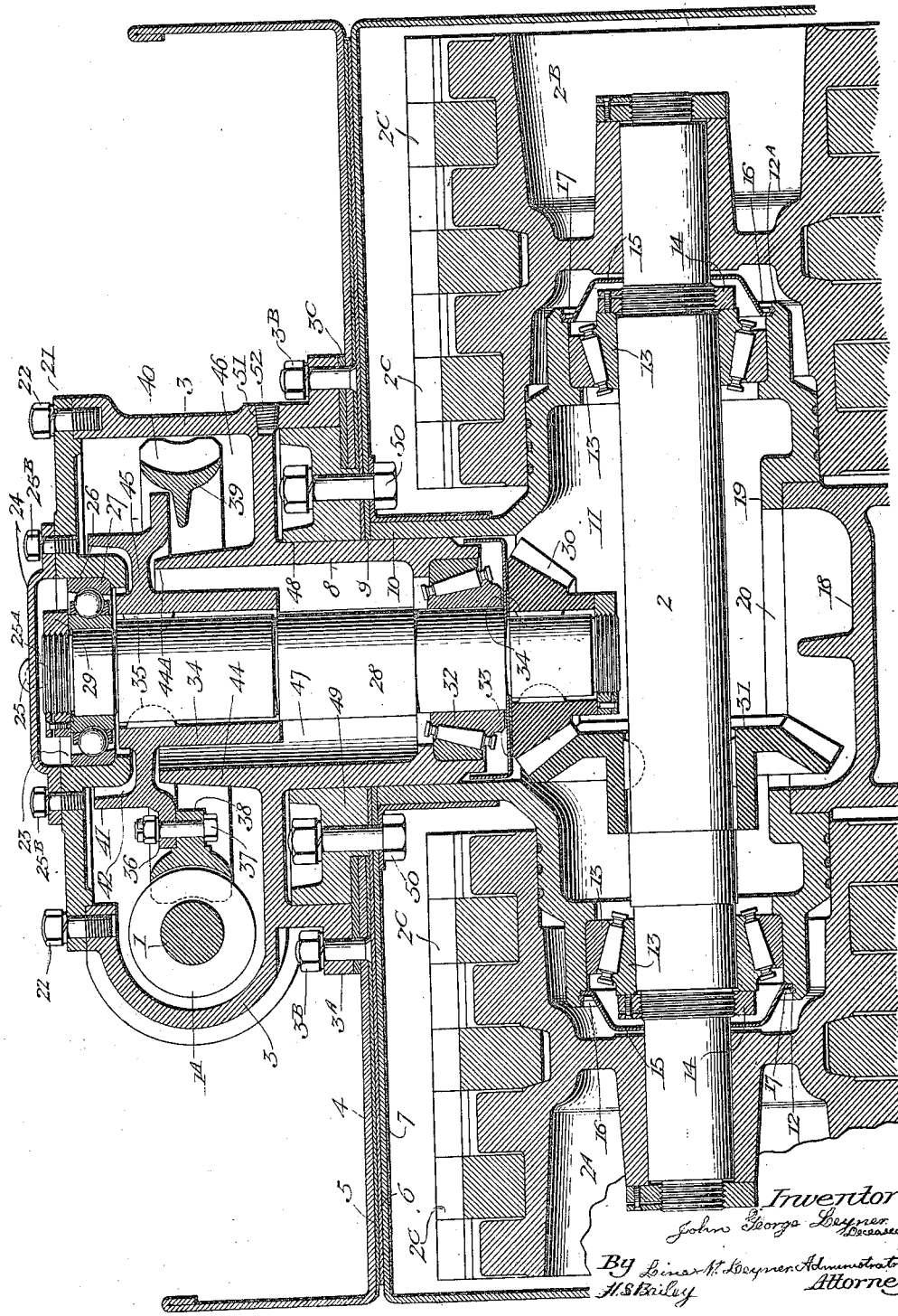

UNITED STATES PATENT OFFICE.

JOHN GEORGE LEYNER, DECEASED, LATE OF LITTLETON, COLORADO, BY LINA M. LEYNER, ADMINISTRATRIX, OF LITTLETON, COLORADO, ASSIGNOR TO THE LEYNER TRACTOR AND MANUFACTURING COMPANY, OF DENVER, COLORADO, A CORPORATION OF COLORADO.

AUTOMATICALLY-OPERATING OILING MECHANISM FOR THE INTERIOR MOTOR-DRIVEN PARTS OF TRACTORS.

1,424,495.   Specification of Letters Patent.   Patented Aug. 1, 1922.

Application filed June 10, 1921. Serial No. 476,548.

*To all whom it may concern:*

Be it known that JOHN GEORGE LEYNER, deceased, late a citizen of the United States of America, and resident of Littleton, county of Arapahoe, and State of Colorado, did invent a new and useful Automatically-Operating Oiling Mechanism for the Interior Motor-Driven Parts of Tractors, of which the following is a specification.

The invention relates to a new automatically operating oiling apparatus mechanism for the interior motor driven parts of tractors, and the objects of my invention are:

First: To provide an oiling mechanism for the motor driven parts of tractors, the parts of which are so cooperatively formed and related as to permit of a continuous supply of oil from the part that first receives the oil, down through all of the rest of the parts that require oiling.

Second: To provide an oiling mechanism for tractors, in which the axle and its driving mechanism is so constructed and arranged that the oil automatically works its way downward and partially submerges the bearings and other engaging parts, from the first part of the mechanism, down to and surrounds the axle. And Third. To provide fixed open topped oil cup and oil well members in the motor driven parts of tractors that are adapted to overflow the oil in them during the regular movements of tractors when traveling.

These objects are attained by the mechanism illustrated in the accompanying drawings, in which:

The view Fig. 1, is a vertical, transverse, sectional view through the forward end of a tractor, showing the oiling system, as applied to the bearings for the power driven axle and other operating parts.

Similar letters of reference refer to similar parts throughout the several views.

Referring to the drawings:

Figure 1 represents a cross section of the motor driven mechanism of a tractor, and in this figure the numeral 1, designates the motor driven shaft of a tractor. There is not illustrated either a complete view of a tractor or of the motor that drives the shaft 1. Through the medium of this shaft 1, and a worm pinion 1ᴬ, which is secured on it, is driven all the mechanism that rotates the axle 2, that rotates the ground treading tracks or the ground rolling wheels of tractors, whichever may be operatively connected to the opposite ends of the axle 2, which are either directly or indirectly driven by the said axle 2.

This motor driven shaft 1, is housed in one end of an elongated casting 3, that projects above the platform portion 4, of a tractor. The casing 3, is provided with a depending flange portion 3ᴬ, which is bolted to the platform 4, by bolts 3ᴮ. A reinforcement plate 3ᶜ, is placed between the flange of the casing 3, and the platform 4.

The platform 4, has a thin steel wear plate 5, that is secured to its under side, and a wear plate 6, is held up against the wear plate 5, by a thick plate 7, that forms the connecting plate between the under side of platform 4, and the pivotal hub portion 8, of the casing 3, with the trucks of the tractor and their endless ground treading tracks. These trucks and their tracks are not illustrated, of which there are either one or two under all tractors that use ground treading tracks as their mechanism for moving over the ground; but the present oiling mechanism for the motor driven parts of tractors has been especially designed for endless ground treading track types of tractors, and consequently there have been illustrated in the sectional view, Figure 1, sprocket wheels 2ᴬ and 2ᴮ, secured on the opposite ends of the axle; and the links 2ᶜ, of an endless track are shown in section, in engagement with the teeth of the sprocket wheels. Full side views of the trucks to which the plate 7, is attached, and a full side view of the endless ground treading tracks are fully illustrated and described in the pending application, Serial Number 374,743, filed April 17, 1920.

The present oiling mechanism is positioned on the tractors between the said motor driven shaft 1, and the axle 2, and applies to them and their intermediate connecting mechanism.

The hub 8, is preferably an integral part of the casing 3, and is cast with it, and depends from its under side. Its lower end portion extends loosely through, but fits closely in an aperture 9, formed through the truck supporting plate 7, and its wear plate 6, which rest on top of the upper end of a hub 10, that forms a part of a T or cross-shaped casting 11, which surrounds the axle 2, and the two alined opposite end portions 12 and 12ᴬ, each of which is provided with a half part of a ball bearing 13, while upon the axle 2, the other half parts of these two ball bearings are secured between collars 14, that are threaded to the axle. And the open ends of this T-shaped casting 11, are closed, and the outer ends of the ball bearings and also the collars are enclosed by a circular plate 15, that fits snugly around the shaft, and its outer edge is secured in an annular recess 16, that is formed in the inside of the outer terminal ends of the ends of the casting 11, by a ring 17.

These end plates keep dust and dirt from entering the ball bearings at the opposite ends of the casting that surrounds the shaft, and at the same time they prevent the oil which works downwardly from the casing 3, from running freely out of this casting through the ball bearings; as the oil works through them to these end plates 15, and collects on top of a central casting 18, that forms the bottom portion of the T-shaped casting 11, that surrounds and supports the axle 2. This casting 18, is removably secured to shouldered end portions 19, that are formed on the bottom of the casting 11, around the edges of an opening 20, formed in the bottom of the casting 11, and this removable bottom portion 19, of the casting is provided, in order to remove the oily sediment that collects there, as well as to examine the ball bearings and the other parts of the shaft, both at the time of assembling them together and also from time to time when the tractor is in use.

The casting 3, is provided with a large opening in its top portion which is closed by a cover 21, that is removably secured to the casing 3, by cap screws 22, and this cover is provided with an aperture 23, that is closed by a cap 24, that is provided with a plugged oil hole 25, in which a plug 25ᴬ, is removably threaded, and the cap 24, is removably secured to the cover 21, by cap screws 25ᴮ. The sides of the aperture 23, are provided with a shouldered edge 26, against which a half part of a ball bearing 27, is placed, the opposite half part of which is secured on the upper end of a vertical shaft 28, the upper terminal end of which projects through the ball bearing far enough to receive a nut 29, which is threaded to it and bears against that part of the ball bearings that is secured on the shaft.

This vertical shaft extends downwardly to close enough to the horizontal axle 2, to rotate it through the medium of a bevel gear pinion 30, that is secured to its lower end, and which meshes with a bevel gear 31, that is secured on the axle 2.

The lower end of the shaft 28, adjacent to its bevel gear 31, is provided with a half part ball bearing 32, the opposing half part of which is secured in the lower end of the pivotal hub portion 8, of the casing 3.

Between this ball bearing and the bevel gear, an open topped oil cup 33, is placed between thin washer shaped shims 34; the upper shims are used to adjust the mating parts of the ball bearing and the lower ones are used to adjust the distance the teeth of its bevel pinion 30, should extend into the teeth of the bevel gear 31, to rotatively drive the bevel gear with the best meshing contact of the teeth obtainable.

On the upper end of the vertical shaft 28, a worm gear supporting hub 34, is secured, preferably by being keyed thereto by semicircular keys 35, that are set onto the shaft, and the hub is provided with slots that allow the hub to be pressed down over the keys onto the shaft.

The hub 34, is provided with a short radial flange 36, that is bolted by bolts 37, to lugs 38, that are formed of the rim portion 39, of a worm gear 40, which meshes with the worm pinion 1ᴬ, of the motor driven shaft 1. The projecting flange portion 36, of the hub 34, is provided with a thin vertically extending annular flange 41, that forms an open top oil cup 42, and it projects up around the ball bearing flange edge 26, of the cover 21, of the casing 3, which is formed to depend below the top of the cover in order that an oil well or pocket is formed around the lower portion of the upper ball bearing of the vertical shaft 28.

The casing 3, at the point where its pivotal center hub portion 8, projects downwardly from it, is also provided with an upwardly and vertically projecting annular flange member 44, the inner surface of which extends up above the center of the motor driven shaft 1, and its worm pinion 1ᴬ, and above the center of the worm rim 39, and the outer edge of the flange of the worm gear 36, depending down below the end of the hub 44, close to the hub 44, and the upper top end of the hub 44, extends up close to the portion 45, of the flange 36, and is above the center of the worm gear and its pinion, and consequently this annular space enclosed by the casing 3, forms an oil cup or oil well space 46, between the top of the hub and the casing that surrounds the worm gear and its pinion that, when filled and kept full of oil, keeps the teeth of the worm pinion and the worm gear constantly lubricated.

The pivotal hub portion 8, of the casing 3, is provided with an axial aperture 47, that surrounds the hub portion 34, of the worm gear 40, loosely so that oil that works over the top edge of the annular rim 44ᴬ, from the oil well 46, can run down the sides of the aperture in the hub into the ball bearing at the lower end of the vertical shaft 28, and into the oil cup below it.

The casing 3, is provided with a machined recess 48, in which a ring 49, is seated, and which is bolted by bolts 50, to the truck supporting plate, and this ring turns on the hub 8, of the casing as the trucks are pivotally swung under the platform to one side or the other, in steering the tractor to turn out of a straight line or to turn corners. As this ring 49, with the truck supporting plate 7, turns on the hub 8, of the casing 3, which is bolted to the platform, it has to be oiled. Preferably, however, instead of connecting it to the oil well 46, of the casing 3, oil is applied to it through a threaded aperture 51, that is formed in the casing 3, that is positioned to enter the upper end of the recess 48, and close the aperture with a threaded plug 52.

The operation of the automatically operating oiling mechanism for the interior motor driven parts of tractors, is as follows:

The oil wells and cups herein described are filled partially full of oil, preferably a mixed liquid and semi-liquid or hard grease oil, when these parts are assembled together when setting up a tractor. Thus, the lower portion of the axle's supporting T-shaped casting 11, is filled with oil about up to the center of the axle, and the cup 33, at the lower ball bearing and the one formed in the worm gear are also filled about half full of this mixture. When the tractor is to be put to work the plug 25ᴬ, is removed from the oil inlet hole in the cap 23, and liquid oil is introduced through it into the casing, through a pipe or a hose, and the semi-liquid oil or hard oil, if it is used, is forced through this hole by a grease gun, and the oil thus introduced flows down through the upper ball bearing of the vertical shaft 28, into the oil cup 42, formed on the worm gear, and enough oil is introduced to cause it to overflow from it into the oil well of the casing 3, which fills up to the top of its annularly vertical flange, which partially submerges the worm pinion and the worm gear, and the oil then overflows into the hollow hub 8, of the casing and runs down through the ball bearing at the lower end of the vertical shaft 28, and fills and overflows the cup 33, and flows into the T-shaped casting 11, where it works into and lubricates the teeth of the bevel gears and also the ball bearings at the opposite ends of this casting. Thus all of the ball bearings of the axle and the vertical shaft and the worm gearing in the casing 3, and the bevel gears in the T-shaped casting, rotate continuously in oil, and if these rotating parts of a tractor are thus supplied with oil at the beginning of a season's work on a farm or ranch, they can be used continuously throughout the season without being re-oiled.

The invention provides a simple, inexpensive and throughly practical oiling mechanism for the interior motor driven parts of tractors, which, while providing superabundant and continuous lubrication to all parts, at the same time removes practically all chance for the intrusion of dirt, grit and other injurious foreign substances to the working parts, and while these have been illustrated and described the preferred construction and arrangement of it, it is not to be limited to it, as changes may be made without departing from the spirit of the invention.

What is claimed as new and desired to be secured by Letters Patent, is:

1. An oiling mechanism for tractors, comprising open topped cups and oil wells formed as integral parts of or attached to the several members of said tractor, a casing surrounding the upper parts of said mechanism, a vertical shaft, the upper end of which extends into said casing, a journal bearing arranged to rotatively support the upper end of said shaft in said casing, said casing being provided with an oil entrance hole to said shaft's journal bearing.

2. An oiling mechanism for tractors, comprising open topped cups and oil wells formed as integral parts of or attached to the several members of said tractor, a casing surrounding the upper parts of said mechanism, a vertical shaft, the upper end of which extends into said casing, a journal bearing arranged to rotatively support the upper end of said shaft in said casing, said casing being provided with an oil entrance hole to said shaft's journal bearing, a worm gear on said vertical shaft, an annular open top oil holding cup on said worm gear filled with oil and arranged to partially surround said journal bearing of said vertical shaft, and to partially submerge it in oil.

3. An oiling mechanism for tractors, comprising open topped cups and oil wells formed as integral parts of or attached to the several members of said tractor, a casing surrounding the upper parts of said mechanism, a vertical shaft, the upper end of which extends into said casing, a journal bearing arranged to rotatively support the upper end of said shaft in said casing, said casing being provided with an oil entrance hole to said shaft's journal bearing, a worm gear on said vertical shaft, an annular open top oil holding cup on said worm gear filled with oil and arranged to partially surround said journal bearing of said vertical shaft, and to partially submerge it in oil, a motor driven shaft in said casing, a worm pinion on said shaft in mesh with the worm gear of said motor driven shaft, and an annular oil holding well in said casing filled with a supply of oil, said oil well being arranged to partially submerge said worm gear and pinion in oil and to catch oil overflowing from said shaft's journal bearing's oil cup.

4. An oiling mechanism for tractors, comprising open topped cups and oil wells formed as integral parts of or attached to the several members of said tractor, a casing surrounding the upper parts of said mechanism, a vertical shaft, the upper end of which extends into said casing, a journal bearing arranged to rotatively support the upper end of said shaft in said casing, said casing being provided with an oil entrance hole to said shaft's journal bearing, a worm gear on said vertical shaft, an annular open top oil holding cup on said worm gear filled with oil and arranged to partially surround said journal bearing of said vertical shaft, and to partially submerge it in oil, a motor driven shaft in said casing, a worm pinion on said shaft in mesh with the worm gear of said motor driven shaft, and an annular oil holding well in said casing filled with a supply of oil, said oil well being arranged to partially submerge said worm gear and pinion in oil and to catch oil overflowing from said shaft's journal bearing's oil cup, an axle on said motor driven mechanism at right angles to said vertical shaft, a bevel gear on said axle, a bevel pinion on said vertical shaft in mesh with the bevel gear of said axle; a depending hub member on said casing, a journal bearing arranged to rotatively support the lower end of said vertical shaft in said hub, and an open topped cup secured on said shaft below said journal bearing and provided with an overflowing supply of oil, said cup being arranged to surround said bearing so as to partially submerge it in oil.

5. An oiling mechanism for tractors, comprising open topped cups and oil wells formed as integral parts of or attached to the several members of said tractor, a casing surrounding the upper parts of said mechanism, a vertical shaft, the upper end of which extends into said casing, a journal bearing arranged to rotatively support the upper end of said shaft in said casing, said casing being provided with an oil entrance hole to said shaft's journal bearing, a worm gear on said vertical shaft, an annular open top oil holding cup on said worm gear filled with oil and arranged to partially surround said journal bearing of said vertical shaft, and to partially submerge it in oil, a motor driven shaft in said casing, a worm pinion on said shaft in mesh with the worm gear of said motor driven shaft, and an annular oil holding well in said casing filled with a supply of oil, said oil well being arranged to partially submerge said worm gear and pinion in oil and to catch oil overflowing from said shaft's journal bearing's oil cup, an axle on said motor driven mechanism at right angles to said vertical shaft, a bevel gear on said axle, a bevel pinion on said vertical shaft in mesh with the bevel gear of said axle; a depending hub member on said casing, a journal bearing arranged to rotatively support the lower end of said vertical shaft in said hub, and an open topped cup secured on said shaft below said journal bearing and provided with an overflowing supply of oil, said cup being arranged to surround said bearing so as to partially submerge it in oil, an oil holding casting surrounding said axle along the center of its length, journal bearing between the opposite ends of said casting and said axle and arranged to rotatively support said axle in said casting, said oil holding casting being arranged and provided with a supply of oil arranged to partially submerge said axle and its journal bearings and its bevel gear, and arranged to receive oil overflowing from the oil cup at the lower end of said vertical shaft.

6. In an oiling system of the character described, the combination with an axle, a supporting housing therefor, having bearings for said axle, a casing having a depending hub upon which the said axle housing is pivotally mounted, a power driven shaft extending down through said hub, and gearing connecting the same with said axle, a cap on said casing, and bearings in said cap and the lower end of said hub for supporting said power driven shaft, of caps for closing the ends of said axle housing, a cup on the lower portion of said power driving shaft surrounding the adjacent bearing, and a reservoir surrounding the upper bearing, the oil in said reservoir overflowing into said casing and thence into said hub, thence through the lower bearing in said hub to said cup, whence it overflows into said axle housing, and an inlet in said casing cap.

In testimony whereof I affix my signature in presence of two witnesses.

Mrs. LINA M. LEYNER,
*Administratrix of the estate of John George Leyner, deceased.*

Witnesses:
THEO. BORGSTEDT,
A. KINZIE.